(12) United States Patent
Lu

(10) Patent No.: US 7,019,643 B2
(45) Date of Patent: Mar. 28, 2006

(54) OUT-OF-RANGE DETECTOR

(75) Inventor: Jin Lu, Croton-on-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 300 days.

(21) Appl. No.: 10/183,778

(22) Filed: Jun. 27, 2002

(65) Prior Publication Data

US 2004/0000993 A1    Jan. 1, 2004

(51) Int. Cl.
*G08B 1/08* (2006.01)

(52) U.S. Cl. .............................. 340/539.13; 340/539.1; 340/539.15; 340/5.32; 340/5.64; 340/573.1; 340/573.4

(58) Field of Classification Search ........... 340/539.13, 340/539.1, 539.15, 5.32, 5.64, 573.1, 573.4
See application file for complete search history.

(56) References Cited

U.S. PATENT DOCUMENTS 5,289,163 A * 2/1994 Perez et al. .................. 340/539
5,525,967 A * 6/1996 Azizi et al. ................ 340/572.1
5,714,932 A * 2/1998 Castellon et al. ........ 340/539.11
5,900,817 A * 5/1999 Olmassakian ............ 340/573.1
6,127,931 A * 10/2000 Mohr ....................... 340/573.4
6,529,131 B1 * 3/2003 Wentworth ................ 340/573.1

OTHER PUBLICATIONS

"An Investment in Your Piece of Mind" http://www.ilovejesus.com/missions/milvet/shield.html, Oct. 25, 2001.

* cited by examiner

*Primary Examiner*—Tai T. Nguyen
(74) *Attorney, Agent, or Firm*—Larry Liberchuk

(57) ABSTRACT

A monitoring system for monitoring a direction of a monitored device when the monitored device is positioned further than a predetermined distance from a monitoring device. The monitoring device receives a locator signal from the monitored device and produces a direction indication that indicates the direction of the received locator signal. If the monitoring device no longer receives the locator signal, the direction indication indicates the direction of the last received locator signal.

19 Claims, 2 Drawing Sheets and produces a direction indication that indicates the direction of the received locator signal. In a case wherein the locator signal is no longer received by the monitoring device, the direction indication indicates the direction of the last received locator signal.

OUT-OF-RANGE DETECTOR

FIELD OF THE INVENTION

The present invention generally relates to a method and device for monitoring a monitored device and particularly relates to a method and system for determining when a monitored device leaves a vicinity of a monitoring device.

BACKGROUND OF THE INVENTION

In this day, it is more and more difficult for an adult to keep an eye on a child. Children have a strong desire to explore when they are in an environment that has lots of activity or objects around, such as a shopping mall. Unfortunately, it is also at this time that a monitoring adult is most distracted. Accordingly, it is easy for the monitoring adult to loose sight of the child and thereby, lead to frantic searching of the immediate area to find the child. Accordingly, it is desirable to determine when a child leaves the area of an adult that is minding the child.

This desire to determine when the monitored device leaves the vicinity of the monitoring device is not limited to the above parent/child scenario. There are many instances when it would be desirable to determine when a monitored object leaves the vicinity of a monitoring device. It is not even essential that the monitored device be the device that is in motion. For example, in a case wherein a person desires to keep track of an object, such as luggage in an airport, it may be desirable for the person to be aware of whether the luggage is in their immediate vicinity. To achieve this desirable result, the person may attach a monitored device to the luggage or place the monitored device within the luggage. In this way, in an event wherein the person is moving about the airport, for example while interacting with airport personnel, the person would also have a means to determine that the luggage is close and not outside an acceptable range from the person.

A conventional monitoring device is known that sets off an alarm when a monitored device leaves the vicinity of a monitoring device. In operation, the monitoring device receives a periodic or continuous signal transmitted by the monitored device. In the above adult/child scenario, the adult carries the monitoring device and the child carries the monitored device. When the monitored device moves a given distance from the monitoring device, the monitoring device will no longer receive the signal. When the monitoring device no longer receives the signal from the monitored device, the monitoring device emits an audible signal to indicate that the monitored device, and the child carrying the monitored device, has moved the given distance, or more, from the monitoring device. This signal acts to alert the adult that the child is no longer in close proximity.

A problem exists with this system in that although the adult is alerted that the child is no longer in close proximity, the adult has no idea in which direction the child is located. In an open area, this does not present a problem since the adult would just look around to determine where the child is located. However, in an area that has many objects around, such as aisles and sales displays, as in the case of the above-mentioned shopping mall, the child may not be directly viewable from the adults vantage point. Accordingly, once again the adult is put in a position to have to wander around the vicinity to determine the current location of the child.

Conventional devices are known that enable determination of a location of the device. For example, a global positioning satellite (GPS) device has a receiving antenna that receives signals from three or more GPS satellites to determine the location of the GPS device within some error tolerance. However, typically a GPS device does not transmit location information to a secondary device. In one known system, utilized for automobile location identification, On-Star™ transmits GPS information to a central monitoring station for the purposes of identifying the location of the automobile for example in the event of an accident. However, this system has many drawbacks in that the system is large and complex and does not lend itself to a simple, cost effective system. Further, the On-Star™ device does not determine when a monitored device leaves the vicinity of a monitoring device.

Accordingly, it is an object of the present invention to overcome the disadvantages of the prior art.

SUMMARY OF THE INVENTION

The invention provides an improved system for monitoring a direction of a monitored device when the monitored device is positioned further than a predetermined distance from a monitoring device. In operation, the monitoring device receives a locator signal from the monitored device and produces a direction indication that indicates the direction of the received locator signal. In a case wherein the locator signal is no longer received by the monitoring device, the direction indication indicates the direction of the last received locator signal.

In one embodiment, the monitoring device provides an alert signal, such as an audible alert or a vibration alert, when the locator signal is not received within a given period of time. The direction indication may change as the orientation of the monitoring device changes such that regardless of the orientation of the monitoring device, the direction indication points in the direction of the last received locator signal. The monitoring device may provide a solicitation signal to the monitored device to solicit the transmission of the locator signal. In this embodiment, the monitored device needs not send the locator signal until after receipt of the solicitation signal. The monitoring device may have a sensitivity adjustment for adjusting the receiving sensitivity of the monitoring device for the locator signal. This provides a user of the monitoring system the ability to readily adjust the distance that the monitoring and monitored device must be apart prior to the monitoring device producing an alert signal.

Advantageously, the system enables a user of the monitoring device to maintain an awareness of the direction and proximity of the monitored device without requiring the user to maintain constant visual contact of the monitored device. These and other features and advantages of the present invention will become more apparent from the accompanying drawings and the following detailed description.

DETAILED DESCRIPTION OF THE INVENTION

Figure 1:
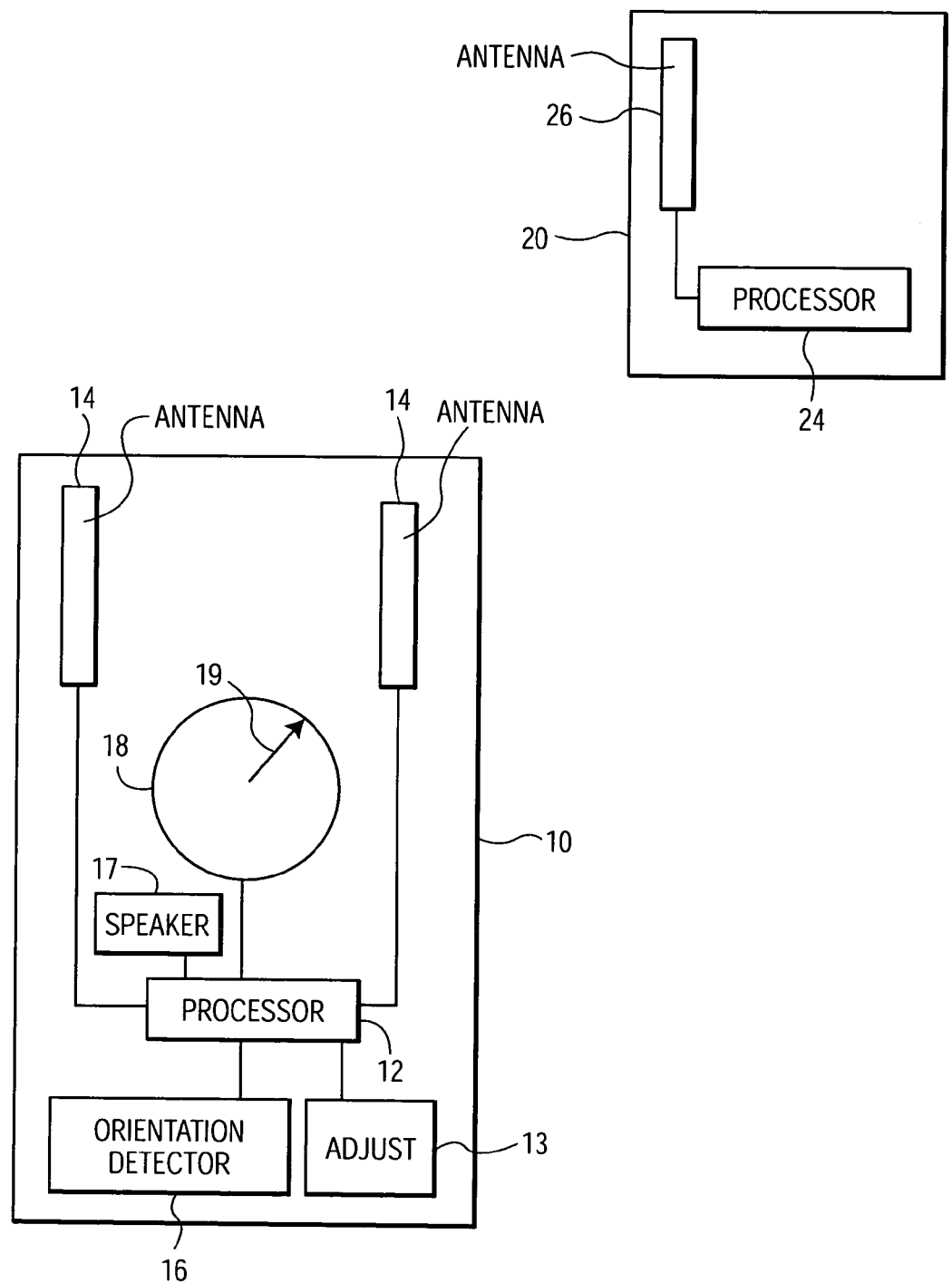
FIG. 1 shows an illustrative embodiment of system including a monitoring device and a monitored device in accordance with the present invention.

FIG. 1 shows an example of a system including a monitoring device 10 and a monitored device 20 in accordance with the present invention. The monitoring device 10 is shown having antenna elements 14, for receiving signals transmitted from the monitored device 20. The monitoring device 10 further has a processor 12, a display 18, an orientation detector 16, an alert output 17, such as a speaker, and a sensitivity adjustment 13. The processor 12 is arranged to receive signals from the antennas 14, the orientation detector 16, and the sensitivity adjustment 13 and is arranged to provide signals to the antennas 14, the alert output 17, and the display 18 as further described herein below.

The monitored device 20 has a processor 24 and an antenna 26. The processor 24 is arranged to transmit and/or receive signals from the antenna 26 and is arranged to provide locator signals that are transmitted to the monitoring device 10 from the antenna 26.

The processor 12 receives the locator signals from the antenna elements 14. Based on the locator signals, the processor 12 provides a display signal to the display 18 that in response thereto, produces a direction indication 19. The direction indication 19 is provided to indicate the direction, in at least a two-dimensional space, from which the locator signal was received. In this way, the direction that the monitored device 20 is located, with reference to the monitoring device 10, is indicated by the direction indication 19. In one embodiment, the processor 12 further may receive an orientation signal from the orientation detector 16 that indicates the orientation of the monitoring device 10. The processor 12 may utilize the orientation signal to maintain the direction indication 19 indicating the direction of the monitored device 20 even in the event of a change in orientation of the monitoring device 10.

Figure 2:
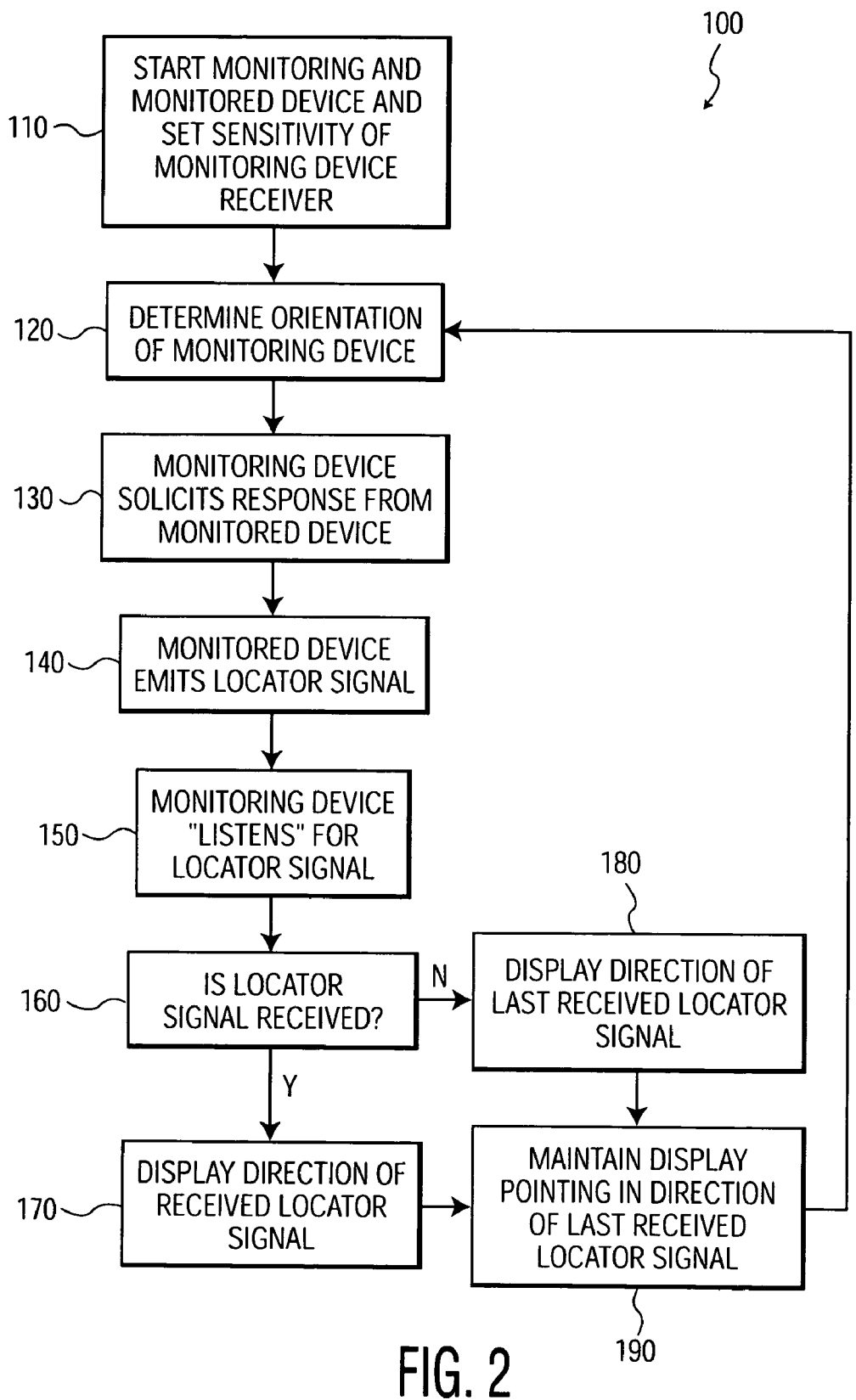
FIG. 2 shows a flow diagram illustrating operation of a system in accordance with the present invention.

Operation of the system will be further described with regard to the illustrative embodiment shown in FIG. 1 and the illustrative flow diagram 100 shown in FIG. 2. Initially, during act 110 both the monitoring device 10 and the monitored device 20 are started. In one embodiment, a receiving sensitivity of the antennas 14 at this time may be adjusted via the sensitivity adjustment 13. The sensitivity adjustment 13 may effectively adjust the receiving sensitivity of the antennas 14 for the locator signal via the processor 12. By adjusting the receiving sensitivity of the monitoring device 10, the effective range of an out-of-range alert is effectively adjusted. It should be noted that in adjusting the receiving sensitivity of the monitoring device 10, it may only be an acceptable threshold of the received locator signal strength that is in fact adjusted. Accordingly, in some embodiments the locator signal may in fact still be received by the monitoring device 10 even after the received locator signal strength is below the acceptable threshold. Accordingly, the discussion herein with regard to adjusting the receiving sensitivity should also be understood to encompass these embodiments.

In any event, the adjustment of the receiving sensitivity is desirable for numerous situations. For example, in a very crowded area, an adult supervisor may desire that an alert be sounded when the monitored device and thereby a child in possession of the monitored device, moves away from an immediate area around the adult. In this case, the adult may adjust the sensitivity adjustment 13 to reduce the receiving sensitivity of the monitoring device 10. In a wide-open area, an adult supervisor may desire that an alert be sounded when the child moves away from an extended area around the adult. In this case, the adult may adjust the sensitivity adjustment 13 to increase the receiving sensitivity of the monitoring device 10.

In one illustrative embodiment wherein the monitoring device 10 is a digital device, the sensitivity adjustment 13 may be simply a dial that adjusts a digital number input to the processor 12. In another embodiment, the sensitivity adjustment 13 may be a resistor having a variable resistance that is altered during the sensitivity adjustment. In one embodiment, the sensitivity adjustment 13 may be connected between the antennas 14 and the processor 12 (not shown). A person of ordinary skill in the art would readily appreciate that there are numerous ways of achieving the above described sensitivity adjustment. Accordingly, the described embodiments should be understood to not be limited to any one particular alternative.

Optionally, during act 120 the monitoring device 10 determines a current orientation of the monitoring device 10 in response to an orientation signal from the orientation detector 16. The orientation detector 16 may be any known system for determining an orientation of a device such as an electronic gyroscope, mercury level switches, compass based systems, etc.

Another exemplary orientation detection circuitry measures two angles that result from movement of a monitoring device 10 in multiple planes of motion. This orientation detection circuitry uses a ball-shaped weight that contacts each of a plurality of stress-sensitive resistive elements. Each of the stress-sensitive resistive elements changes its resistance in accordance with the magnitude of the force or stress applied thereto by the ball-shaped weight. This applied stress varies in a predictable way as a function of the orientation of the monitoring device 10, and can therefore be used to detect directions of movement and orientation of the monitoring device 10. This system is more fully described in U.S. Pat. No. ?? (Disclosure 702223) incorporated herein by reference as if set out herein.

The orientation determining devices described herein are only set out to facilitate the illustrative description and are not intended to limit the scope of the present invention. Numerous alternate embodiments would readily occur to a person of ordinary skill in the art. It should be obvious that the orientation determination act (e.g., act 120) may be performed before or after any of the other acts performed herein. In one embodiment, the orientation determination act is performed periodically after receipt of a locator signal such that a display of the direction of the monitored device 20 may be maintained appropriately as described further herein below (e.g., see act 190).

In act 130, the monitoring device 10 may transmit a solicitation signal to the monitored device 20 to solicit a locator signal from the monitored device 20. The processor 24 through the antenna 26 receives the solicitation signal. In response to the solicitation signal, the processor 24 in act 140 transmits the locator signal to the monitoring device 10 through the antenna 26. In an alternate embodiment, the monitored device 20 transmits the locator signal continuously or periodically irrespective of whether a solicitation signal is transmitted by the monitoring device 10 or is received by the monitored device 20. In these embodiments accordingly, the monitoring device 10 may not transmit a solicitation signal.

In any event, during act 150 the monitoring device 10 enters a receive mode to "listen" for a locator signal from the monitored device 20. By the term listen, what is meant is that the monitoring device 10 enters a receive mode for some period of time to await receipt of a locator signal. In the event that the locator signal is received, the locator signal is received by the processor 12 through at least one of the antennas 14. During act 160, the processor 12 determines whether the locator signal was received.

When the locator signal is received, the processor 12 determines the direction of the received locator signal. How this determination is made should not be interpreted as a limitation to the present invention since there are many known ways of accomplishing this determination. In one embodiment, the processor 12 determines a differential signal between the different timing of receipt of the locator signal by each of the antennas 14. In another embodiment, the processor 12 may determine a phase difference between the locator signal as received by each of the antennas 14.

In yet another embodiment, only one of the antennas 14 need be present as a single directional antenna. In this embodiment, when the antenna 14 points at the monitored device 20 (imagine a line connecting the two devices), the signal energy of the received locator signal is relatively high. When the antenna 14 points away from the monitored device 20, the signal energy of the received locator signal decreases proportional to the pointing angle with respect to the imaginary line connecting the monitoring device 10 and monitored device 20. Based on the signal energy of the received locator signal, the direction of the received locator signal may be determined. In this or another embodiment, the antenna 14 (the directional antenna) of the monitoring device 10 may be rotated by a motor. In this way, the directional antenna 14 may be maintained pointing in the strong signal energy direction.

In a case wherein the monitoring device 10 receives a mutli-path signal (e.g., when the locator signal is deflected from objects such that the monitoring device 10 receives multiple images of the locator signal in addition to the image from the direct path) the processor 12 must choose the direction associated with the direct path. The direct path usually corresponds to the highest energy level and the smallest time delay of the received signal. In either event, there are many known methods of eliminating or distinguishing between multi-path signals. Each of these above and other known systems may operate to determine the direction from which the locator signal originated and thereby, the direction of the monitored device 20.

When a locator signal is received, the monitoring device 10 in act 170 displays a direction indication 19 on the display 18. The direction indication 19 indicates the direction from which the locator signal was received. Accordingly, the direction indication 19 provides a user an indication of the direction in which the monitored device 20 is located with regard to the monitoring device 10. The direction indication 19 is updated during act 190 to maintain a proper indication of the direction of the monitored device 20 in at least a two-dimensional space even if the orientation of the monitoring device 10 is altered with respect to the monitored device 20. For example, if the monitoring device 10 is positioned in one orientation upon receipt of the locator signal and thereafter, is position in a second orientation, the direction indication 19 is updated to properly display the direction from which the locator signal was received.

The processor 12 utilizes the orientation signals received from the orientation detector 16 to determine whether a change in orientation of the monitoring device 10 has occurred. In operation, the processor 12 determines if there is a difference between an earlier received orientation signal and a later received orientation signal. When there is a difference between an earlier received orientation signal and a later received orientation signal, the processor 12 calculates a change in orientation signal. This change in orientation signal is utilized by the processor 12 to calculate a new direction signal that is thereafter provided to the display 18. From the above discussion, it should be clear that the orientation determination is not required to be an absolute measurement, such as in a compass heading. However, in some embodiments the orientation determination may be determined as an absolute measurement. These embodiments merely utilize a relative determination to detect a change in the orientation of the monitoring device 10 from one period to another.

In any event, thereafter, the process repeats again with act 120 until the monitoring device 10 does not receive a locator signal during act 160. When a locator signal is not received during act 160 or is below the set acceptable receive threshold (see, discussion above regarding act 110), the processor 12 provides a signal to the display 18 initiating a direction indication 19 during act 180. The direction indication 19 indicates the direction from which the last received locator signal was received. Accordingly, the direction indication 19 provides a user an indication of the direction in which the monitored device 20 was last located, with regard to the monitoring device 10, when the last locator signal was received or was above the set acceptable receive threshold.

The processor 12 may also provide an alert signal to the alert output 17 that in response produces an alert for the user. The alert may be an audible alert, in which case the alert output may be a speaker. In another embodiment, the alert output may be a vibration output that produces a vibration that is tactilely received by the user. In yet another embodiment, the alert output may be both of an audible and a vibration output. Other devices for alerting a user would be apparent to a person of ordinary skill in the art.

In any event, the direction indication 19 may be updated during act 190 to maintain a proper indication of the direction of the monitored device 20 as discussed above. In one embodiment wherein the locator signal is still received by the monitoring device 10, yet the received signal strength is below the set acceptable receive threshold, the determined direction of the received locator signal may be utilized to maintain the direction indication 19 pointing in the direction of the received locator signal. This system may also be utilized after act 170 to maintain the direction indication 19 pointing in the direction of the received locator signal without or together with a signal from an orientation detector, such as the orientation detector 16.

The embodiments of the invention described above are intended for purposes of illustration only, and should not be construed as limiting the appended claims to any particular embodiment or group of embodiments. Numerous alternative embodiments may be devised by those having ordinary skill in the art without departing from the spirit and scope of the following claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function; and e) each of the disclosed elements may be comprised of hardware portions (e.g., discrete electronic circuitry), software portions (e.g., computer programming), or any combination thereof.

What is claimed is:

1. A monitoring system comprising:
   a monitoring device; and
   a monitored device, wherein the monitoring device is configured to receive a locator signal from the monitored device and is configured to produce a direction indication indicating the direction of a last received locator signal if the locator signal is no longer received, wherein the direction indication is a first direction indication and the monitoring device comprises an orientation detector configured to determine an orientation of the monitoring device, and wherein the monitoring device is configured to produce a second direction indication indicating the direction of the last received locator signal if the orientation detector determines a change in the orientation of the monitoring device.

2. The monitoring system of claim 1, wherein the monitoring device is configured to provide a direction indication if a locator signal is received.

3. The monitoring system of claim 1, wherein the monitoring device comprises an alert indication configured to provide an alert when a locator signal is not received within a predetermined period of time.

4. The monitoring system of claim 3, wherein the alert is at least one of an audible alert and a vibration alert.

5. The monitoring system of claim 1, wherein the monitoring device is configured to provide a solicitation signal to the monitored device and the monitored device is configured to provide the locator signal in response to a received solicitation signal.

6. The monitoring system of claim 1, wherein the monitoring device comprises a sensitivity adjustment configured to adjust a receiving sensitivity of the monitoring device for the locator signal.

7. The monitoring system of claim 1, wherein the locator signal is a first locator signal, and wherein the monitoring device is configured to receive a second locator signal and produce the direction indication in dependence of the first locator signal and the second locator signal.

8. The monitoring system of claim 7, wherein the direction indication is produced in dependence of a differential signal between the first locator signal and the second locator signal.

9. The monitoring system of claim 7, wherein the direction indication is produced in dependence of a phase difference between the first locator signal and the second locator signal.

10. The monitoring system of claim 1, the monitoring device comprising a directional antenna.

11. A method of monitoring a monitored device comprising the acts of:
    receiving a locator signal from the monitored device;
    producing a first direction indication indicating a direction of a last received locator signal if the locator signal is no longer received;
    determining an orientation of the monitoring device; and
    producing a second direction indication indicating the direction of the last received locator signal if there is a change in the orientation of the monitoring device.

12. The method of claim 11, comprising the act of providing a direction indication indicating a current direction of the monitored device with respect to the monitoring device if a locator signal is received.

13. The method of claim 11, comprising the act of providing an alert when a locator signal is not received within a predetermined period of time.

14. The method of claim 13, wherein the alert is at least one of an audible alert and a vibration alert.

15. The method of claim 11, comprising the act of:
    providing a solicitation signal to the monitored device; and
    providing the locator signal in response to a received solicitation signal.

16. The method of claim 11, comprising the act of adjusting a receiving sensitivity of the monitoring device for the locator signal.

17. The method of claim 11, wherein the locator signal is a first locator signal, the method comprising the acts of
    receiving a second locator signal; and
    producing the direction indication in dependence of the first locator signal and the second locator signal.

18. The method of claim 17, wherein the direction indication is produced in dependence of a differential signal between the first locator signal and the second locator signal.

19. The method of claim 17, wherein the direction indication is produced in dependence of a phase difference between the first locator signal and the second locator signal.

* * * * *